United States Patent
Passone

[19]

[11] Patent Number: 5,107,624
[45] Date of Patent: Apr. 28, 1992

[54] FRAME FOR A MOTOR VEHICLE DOOR AND A DOOR INCLUDING THE FRAME

[75] Inventor: Pietro Passone, Vinovo, Italy

[73] Assignee: E.M.A.R.C. S.r.l., Turin, Italy

[21] Appl. No.: 634,235

[22] Filed: Dec. 27, 1990

[30] Foreign Application Priority Data

Jan. 5, 1990 [IT] Italy ................ 67007 A/90

[51] Int. Cl.⁵ ........................................... B60J 5/04
[52] U.S. Cl. ................................. 49/502; 296/146
[58] Field of Search ............ 49/502, 501; 296/146

[56] References Cited

U.S. PATENT DOCUMENTS

| | | | |
|---|---|---|---|
| 4,387,536 | 6/1983 | Prato | 49/502 |
| 4,432,167 | 2/1984 | Watanuki | 49/502 |
| 4,648,208 | 3/1987 | Baldamus et al. | 49/502 |
| 4,934,101 | 6/1990 | Hannya et al. | 49/502 |

FOREIGN PATENT DOCUMENTS 677077 3/1930 France .
2068306 8/1981 United Kingdom ............ 49/502

*Primary Examiner*—Philip C. Kannan
*Attorney, Agent, or Firm*—Sughrue, Mion, Zinn, Macpeak & Seas

[57] ABSTRACT

The frame is intended to be mounted on a lower panel of a motor vehicle door. It comprises two uprights, a front upright and a rear upright respectively, joined at their upper ends by a cross member and adapted to define, together with upper edge of the lower panel, a space for the window associated with the door. The uprights and the cross member are formed by at least two shaped elements joined longitudinally so as to form a box structure. The frame can thus assume the desired three-dimensional configuration and its dimensions can vary in the general plane of the door and in the direction perpendicular thereto. The uprights may also extend downwardly so as to constitute a reinforcement for the side edges and portions of the lower edge of the lower panel adjacent thereto.

3 Claims, 5 Drawing Sheets

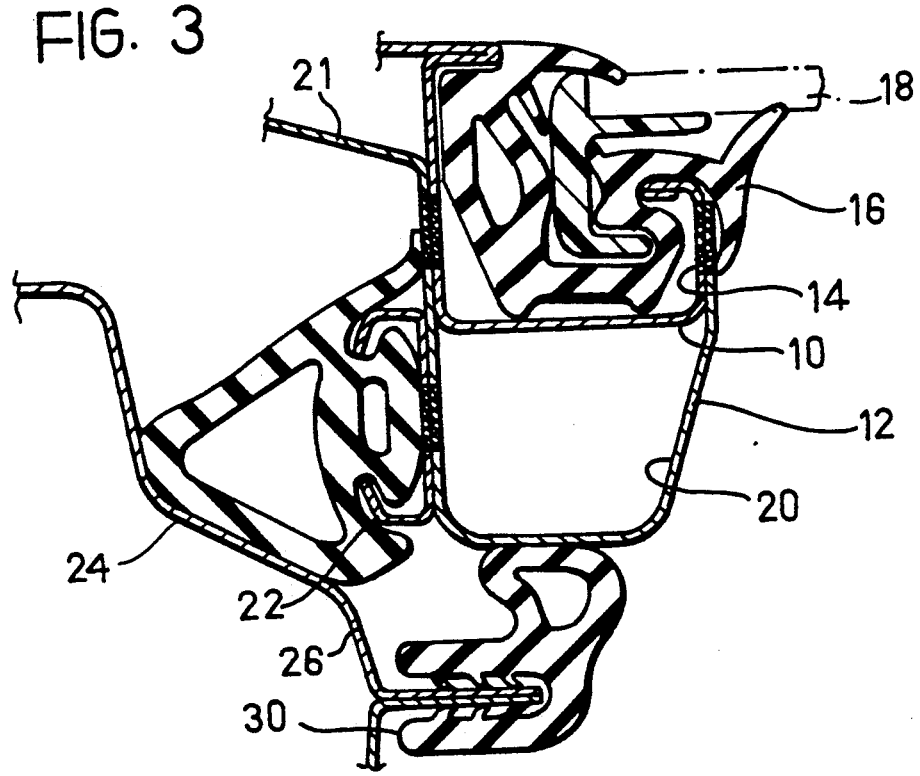
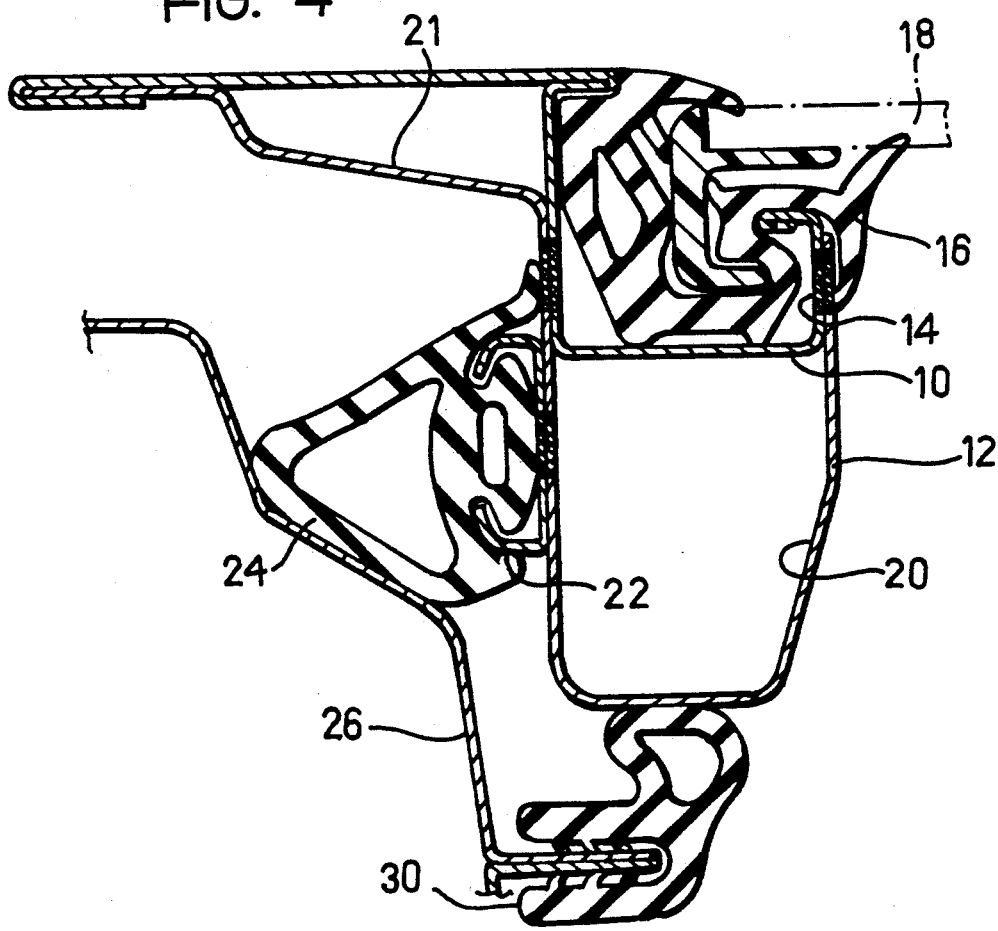

FRAME FOR A MOTOR VEHICLE DOOR AND A DOOR INCLUDING THE FRAME

BACKGROUND OF THE INVENTION

The present invention relates to a frame for a motor vehicle door having a panel connected to the frame, the frame including two uprights, a front upright and a rear upright respectively, connected to the panel at their lower ends and joined at their upper ends by a cross member, and being adapted to define, together with the upper edge of the panel, a space for the window associated with the door.

Known frames of the type indicated above may be formed by a first box section which constitutes one of the two uprights and a second box section which constitutes the cross member and the other upright and is welded to one end of the first section, or by a single section which constitutes the cross member and the two uprights. In both cases, the sections are bent so as to assume the desired shape. They necessarily have a constant cross-section but, from the structural point of view, it would be desirable for the uprights to have larger cross-sections at their lower ends which are more stressed mechanically.

Moreover, motor vehicle doors are known which are constituted by two half-shells, each formed by a lower panel with an integral frame, produced by pressing and subsequently combined. The desired variation of the dimensions of the frame can thus be achieved by the suitable shaping of the two half-shells. However, it is necessary to use a pressing technique much more complex and expensive than that described above.

SUMMARY OF THE INVENTION

In order to avoid the disadvantages mentioned, the subject of the present invention is a frame of the type indicated above, characterised in that the uprights and the cross member are constituted by at least two shaped elements joined longitudinally so as to form a box structure.

A further subject of the present invention is constituted by a motor vehicle door including a frame having the characteristics mentioned above.

According to the present invention, the aforementioned elements can conveniently be shaped and then joined together so that the frame assumes the desired three-dimensional configuration with the desired dimensional variations in the general plane of the door and in the direction perpendicular thereto.

In a preferred embodiment of the invention, one of the elements may be shaped by pressing, possible blanking, and three-dimensional bending. As will be described in greater detail below, this operation is carried out on thin, elongate pieces of material and is thus very easy, producing less waste than the aforementioned technique which provides for the pressing of the complete half-shells constituting the door.

BRIEF DESCRIPTION OF THE DRAWINGS

Further advantages and characteristics of the present invention will become clear from the detailed description which follows, with reference to the appended drawings, provided by way of non-limiting example, in which:

FIGS. 2, 3 and 4 are sections taken on the lines II—II, III—III and IV—IV of FIG. 1 respectively, showing the frame according to the invention in association with the weather-strips and the adjacent parts of the motor vehicle body.

DETAILED DESCRIPTION OF THE INVENTION

Figure 1:
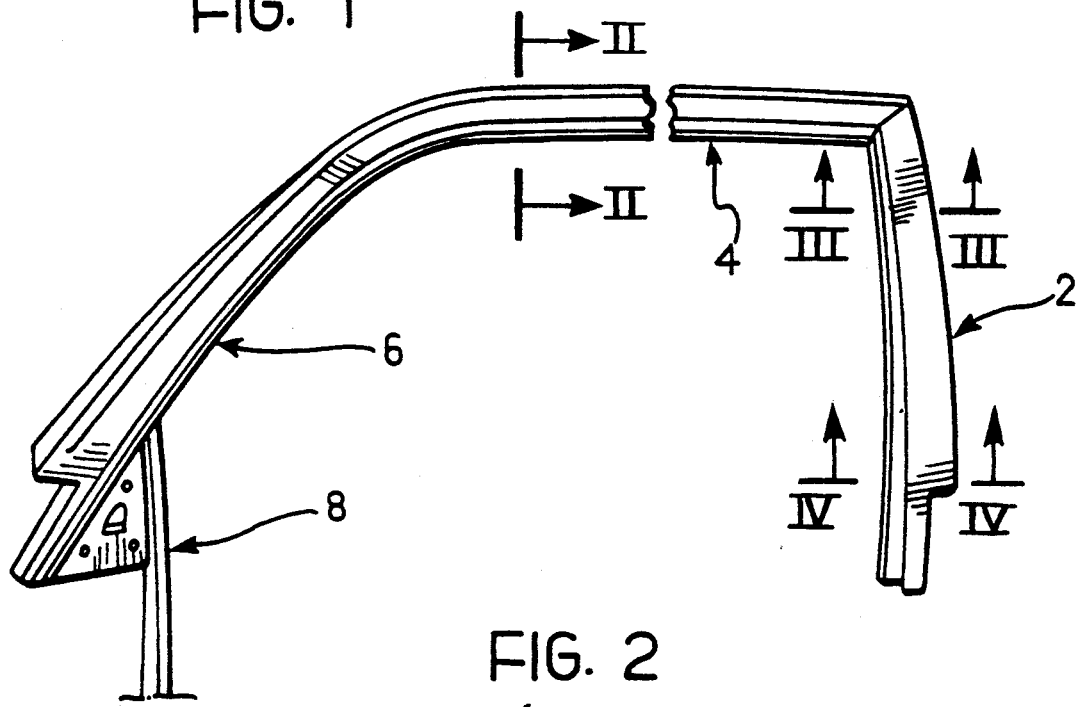
FIG. 1 is a perspective view of a frame according to the invention.

FIG. 1 shows a frame for a front door of a motor vehicle, the frame being intended to be mounted on a lower panel, not shown, so as to define the space for the window. The frame is constituted by a rear upright 2 welded at its upper end to a cross member 4 which extends to form a front upright 6 to the lower end of which a guide profile 8 for the glass of the window is welded.

Figure 2:
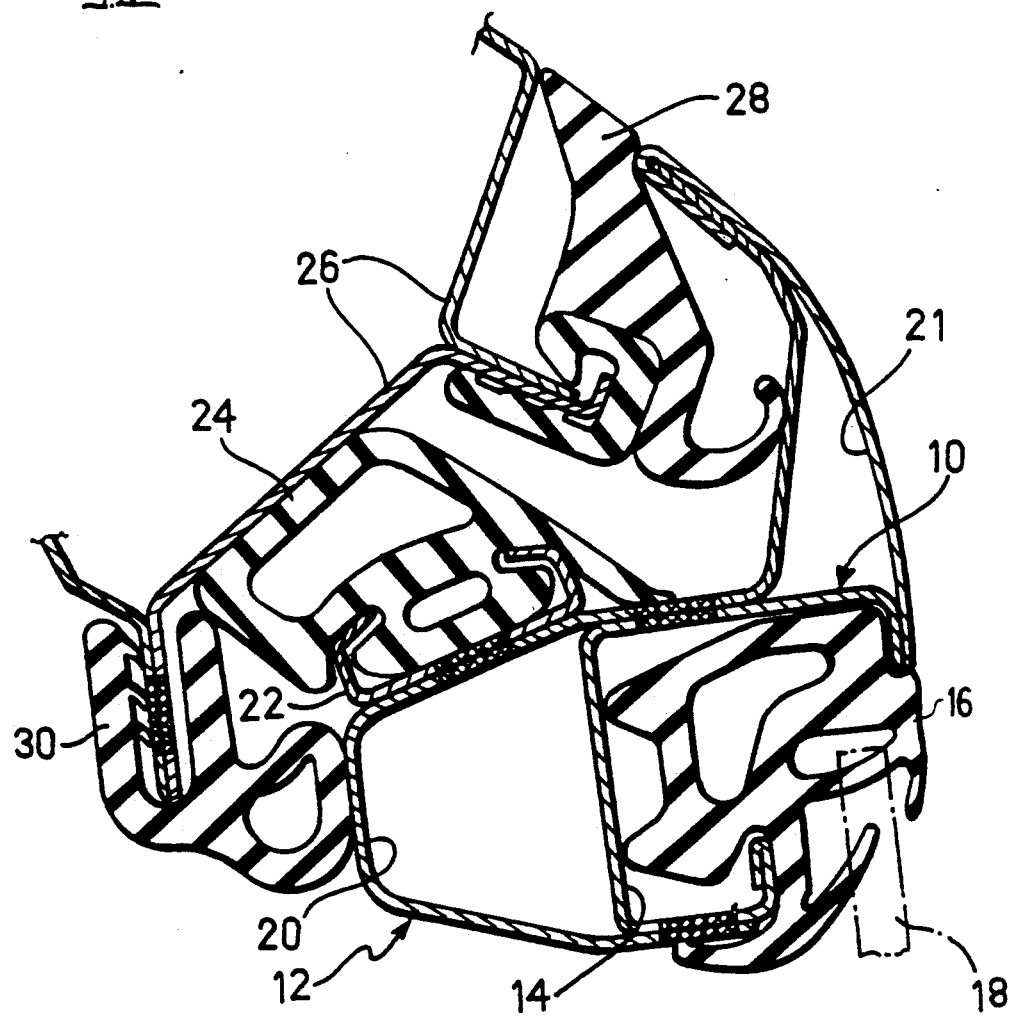

The uprights 2, 6 and the cross member 4 are constituted (FIGS. 2 to 4) by a first shaped element 10 which is positioned externally and to the inside of which a second shaped element 12 is welded longitudinally.

The first element 10 is formed so as to have a recess 14 in which a weather-strip 16 is housed to effect a seal with the window 18. The two shaped elements 10, 12 define internal cavities 20 and 21 whose widths increase towards the lower end of the upright 2 (as can be seen by comparing FIGS. 3 and 4) and enable the desired strengthening of that portion. The front upright 6, not shown in detail in section, has the same structure.

A third shaped element 22 produced by profiling is welded to the second shaped element 12 and houses another weather-strip 24 which is intended to abut the frame 26 of the motor vehicle on which further weather-strips 28, 30 which abut the frame are mounted in turn.

As can be seen from FIG. 1, the transverse dimensions of the uprights 2, 6 are not constant in the general plane of the door but decrease gradually towards their upper ends.

During the production of the frame, the profiled element 10 is first blanked according to a predetermined pattern and is bent in three dimensions so that the finished piece gives the door a wrap-around appearance. The shaped element 12 is pressed separately from a straight piece of material and is then bent in three dimensions to the desired configuration. The element 12, the profiled element 22, which is also bent beforehand, and the element 10 are then assembled and welded together to produce an upright 6 or a piece forming the upright 2 and the cross member 4, in dependence on the profile of curvature adopted and the lengths of the elements used.

The complete frame is produced by the welding of the upper end of an upright 6 to a piece forming the upright 2 and the cross member 4 and can then be assembled with the other components of the door.

Figure 5:
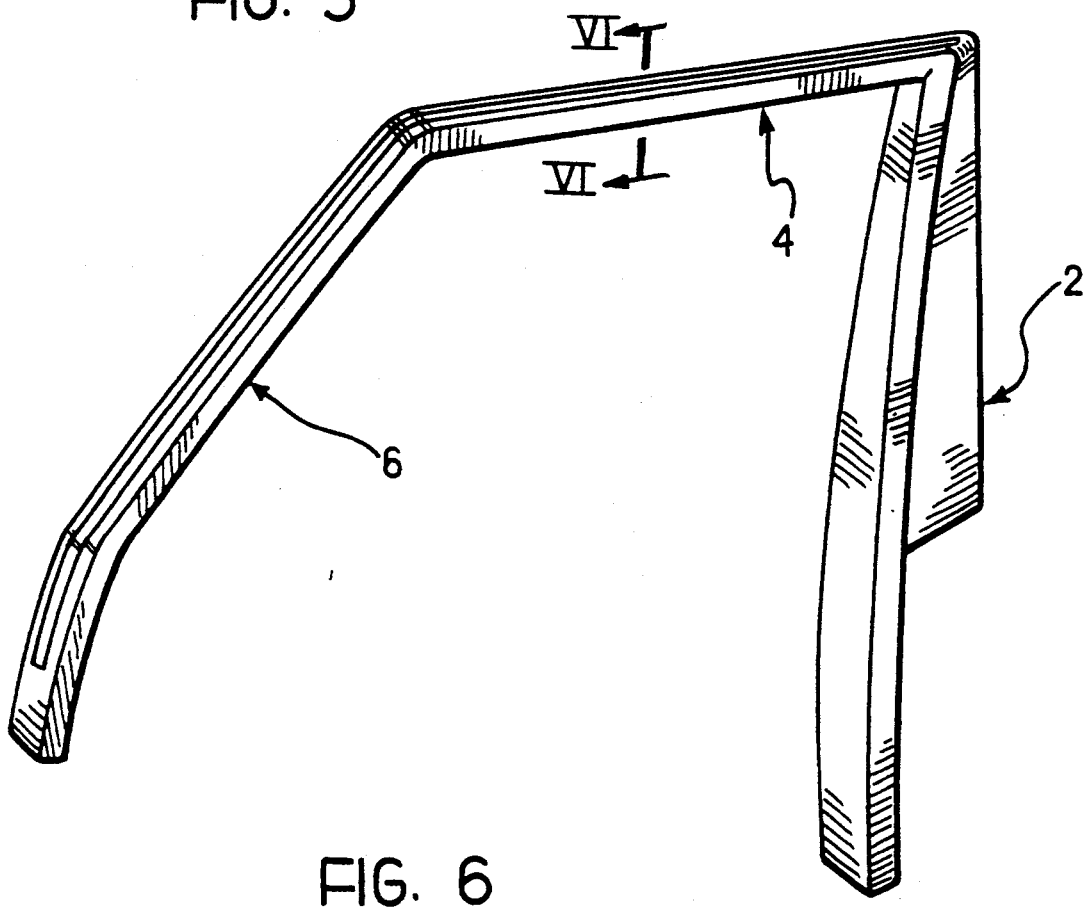
FIG. 5 is a perspective view of an alternative embodiment of a frame according to the invention.
Figure 6:
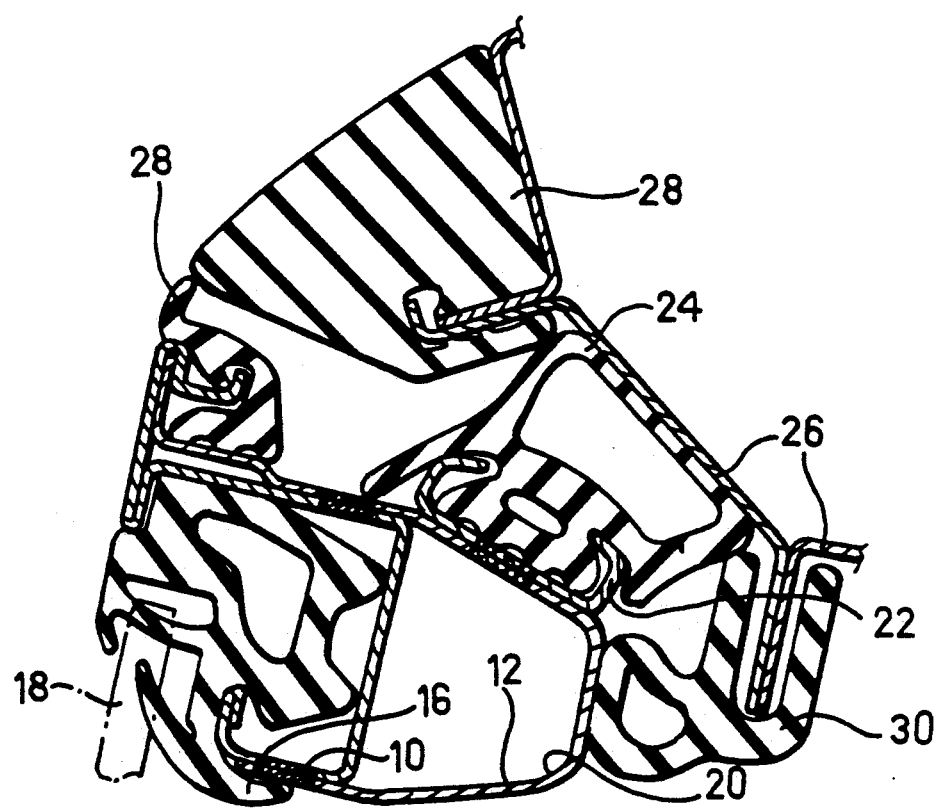
FIG. 6 is a section taken on the line VI—VI of FIG. 5 and also shows weather-strips and parts of the motor vehicle body adjacent the frame.

FIGS. 5 and 6 show an alternative embodiment of the invention, in which the same reference numerals correspond to parts the same as or equivalent to those described above.

Unlike the previous case, the front upright 6 has constant transverse dimensions in the general plane of the door and the shape of the profiled element 10 in correspondence with the cross member 4 is not such as to create a wrap-around appearance (FIG. 6). Other details, such as, for example, the progressive variation of the sections of both the uprights 2, 6 and of the transverse dimension of the upright 2, correspond to those described previously.

Figure 7:
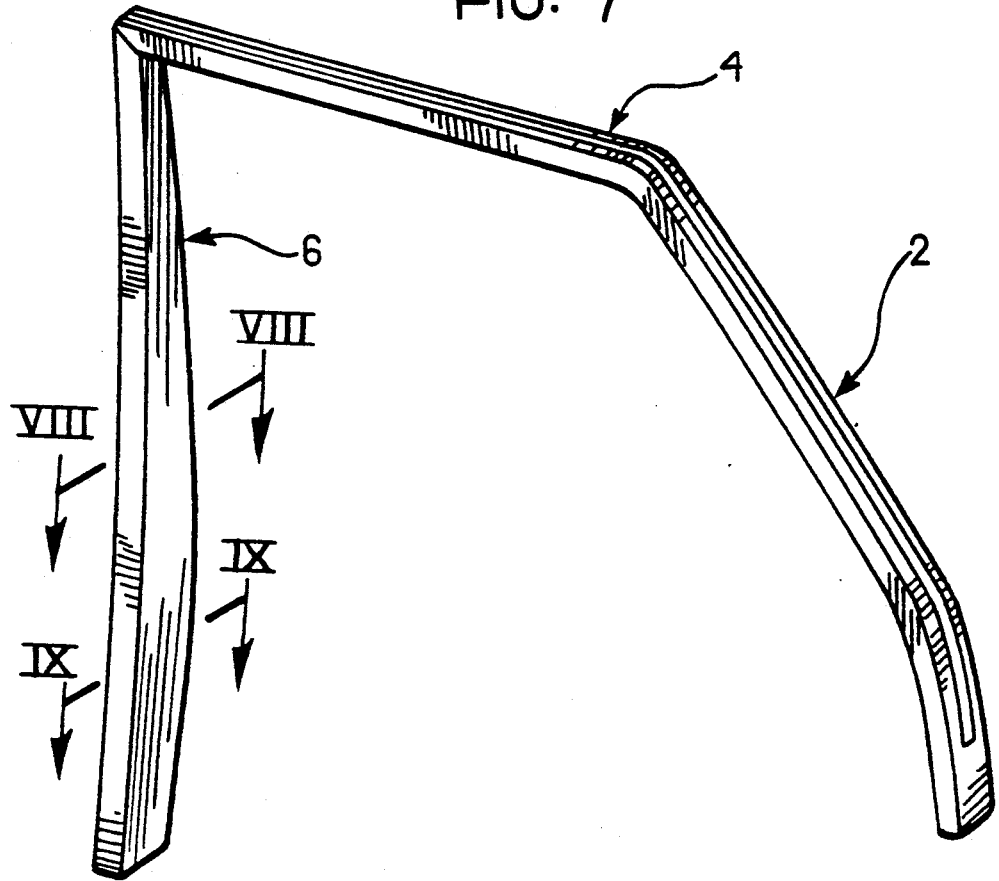
FIG. 7 is a perspective view of a further alternative embodiment of a frame according to the invention.
Figure 8:
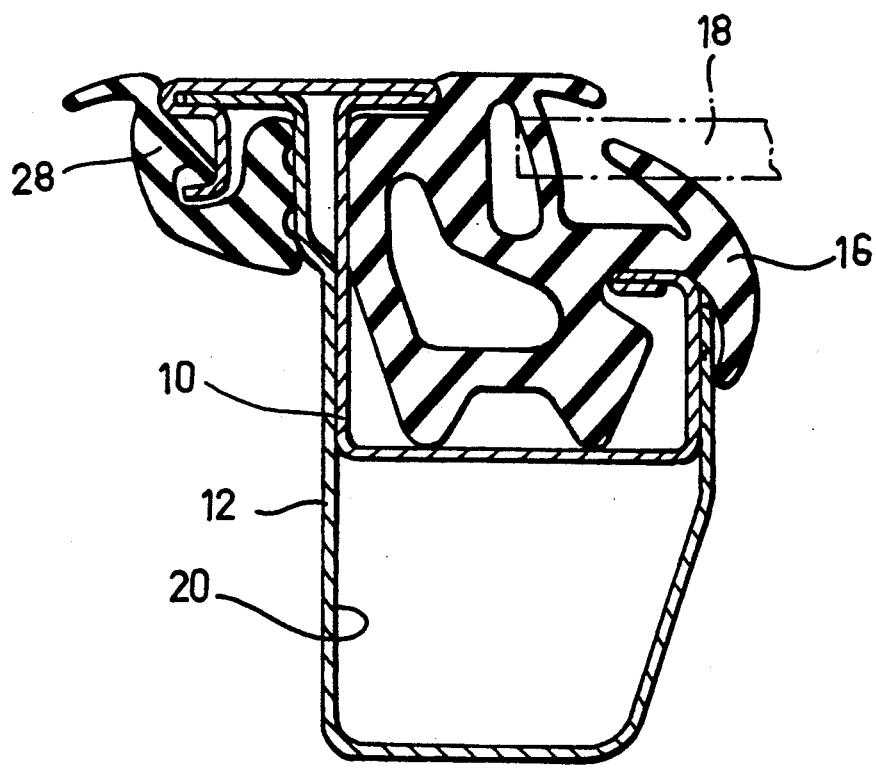
FIGS. 8 and 9 are sections taken on the lines VIII—VIII and IX—IX of FIG. 7 and also show weather-strips and parts of the motor vehicle body adjacent the frame.
Figure 9:
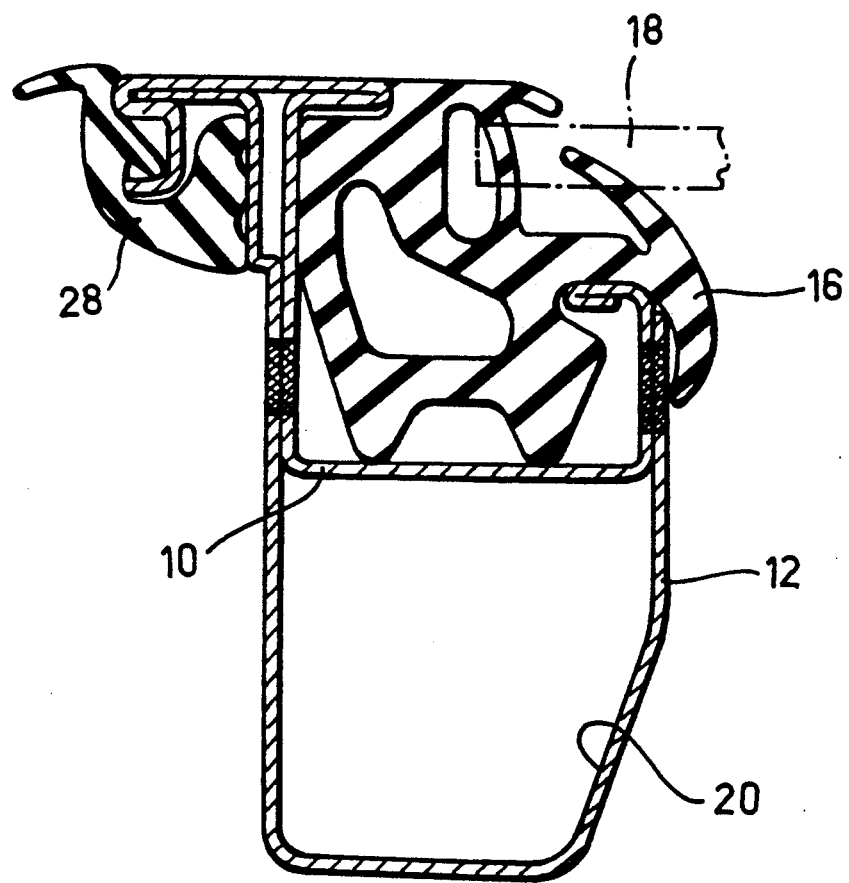

FIGS. 7, 8 and 9 show a further embodiment of the frame, in this case for a rear door, in which the same reference numerals correspond to parts the same as or equivalent to those described above.

In this case, both the uprights 2, 6 have constant transverse dimensions in the general plane of the door and progressively varying cross-sections which strengthen their lower portions. The cross member 4 extends to form the rear upright 2 and is welded to the front upright 6 or, in an embodiment not illustrated, also extends to form the front upright 2.

In a further embodiment of the invention not illustrated in the figures, the uprights of the frame may extend downwardly so that their lower ends constitute respective reinforcements of the side edges of the lower panel of the motor vehicle door and of the portion of the lower edge of the panel adjacent the side edges.

I claim:

1. A frame for a motor vehicle door having a panel connected to the frame, the frame including two uprights, a rear upright and a front upright respectively, connected to the panel at their lower ends and joined at their upper ends by a cross member and being adapted to define, together with the upper edge of the panel, a space for the window associated with the door, the uprights and the cross member being formed by at least two shaped elements joined longitudinally so as to form a box structure, wherein at least one of the uprights has a cross-section which decreases progressively from its lower end to its upper end.

2. A frame according to claim 1, wherein the transverse dimensions of the two uprights in the general plane of the door decrease progressively from their lower ends to their upper ends.

3. A frame according to claim 1, wherein the transverse dimension of one of the uprights in the general plane of the door decreases progressively from its lower end to its upper end, while the transverse dimension of the other upright is constant.

* * * * *